US010817728B2

United States Patent
Mehdi et al.

(10) Patent No.: US 10,817,728 B2
(45) Date of Patent: Oct. 27, 2020

(54) AUTOMATED DATA COLLECTION FOR CONTINUED REFINEMENT IN THE DETECTION OF OBJECTS-OF-INTEREST

(71) Applicant: GM Global Technology Operations LLC, Detroit, MI (US)

(72) Inventors: Syed B. Mehdi, Farmington Hills, MI (US); Yasen Hu, Warren, MI (US); Upali P. Mudalige, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 123 days.

(21) Appl. No.: 16/255,056

(22) Filed: Jan. 23, 2019

(65) Prior Publication Data

US 2020/0234061 A1 Jul. 23, 2020

(51) Int. Cl.
| | |
|---|---|
| *G06F 9/00* | (2006.01) |
| *G06K 9/00* | (2006.01) |
| *B60W 50/00* | (2006.01) |
| *G06T 7/50* | (2017.01) |
| *G06K 9/20* | (2006.01) |
| *G06K 9/62* | (2006.01) |

(52) U.S. Cl.
CPC ......... *G06K 9/00791* (2013.01); *B60W 50/00* (2013.01); *G06K 9/2054* (2013.01); *G06K 9/6256* (2013.01); *G06K 9/6262* (2013.01); *G06T 7/50* (2017.01); *B60W 2050/0083* (2013.01); *G06T 2207/30252* (2013.01)

(58) Field of Classification Search
CPC ............ G06K 9/00791; G06K 9/6262; G06K 9/2054; G06K 9/6256; G06T 7/50; G06T 2207/30252; B60W 50/00; B60W 2050/0083
USPC ....................................................... 382/104
See application file for complete search history.

(56) References Cited

U.S. PATENT DOCUMENTS

| | | | | |
|---|---|---|---|---|
| 9,607,402 | B1 * | 3/2017 | Whiting | G08G 1/015 |
| 9,805,474 | B1 * | 10/2017 | Whiting | G08G 1/166 |
| 10,015,360 | B1 * | 7/2018 | Kurzhanskiy | G06K 9/0063 |
| 2010/0104199 | A1 * | 4/2010 | Zhang | G08G 1/165 |
| | | | | 382/199 |
| 2017/0069206 | A1 * | 3/2017 | Dannenbring | G08G 1/09626 |

\* cited by examiner

*Primary Examiner* — Juan A Torres
(74) *Attorney, Agent, or Firm* — Quinn IP Law

(57) ABSTRACT

A method of updating an identification algorithm of a vehicle includes sensing an image and drawing boundary boxes in the image. The algorithm attempts to identify an object-of-interest within each respective boundary box. The algorithm also attempts to identify a component of the object-of-interest within each respective boundary box, and if component is identified, calculates an excluded amount of a component boundary that is outside an object boundary. When the excluded amount is greater than a coverage threshold, the algorithm communicates the image to a processing center, which may identify a previously un-identified object-of-interest in the image. The processing center may add the image to a training set of images to define a revised training set of images, and retrain the identification algorithm using the revised training set of images. The updated identification algorithm may then be uploaded onto the vehicle.

15 Claims, 3 Drawing Sheets

AUTOMATED DATA COLLECTION FOR CONTINUED REFINEMENT IN THE DETECTION OF OBJECTS-OF-INTEREST

INTRODUCTION

The disclosure generally relates to a method of updating an identification algorithm of a vehicle used to identify an object-of-interest, and a vehicle and system therefor.

Many vehicles include an object identification system for detecting an object-of-interest near the vehicle. The object identification system may use a sensor, such as but not limited to a camera, that captures or senses an image. An identification algorithm may be used to detect an object-of-interest in the sensed image. The identification algorithm may be trained to identify the object-of-interest using a training set of images containing the one or more views or variations of the object-of-interest. If an object in the sensed image appears similar to an object previously identified in one or more of the training set of images as the object-of-interest, the identification algorithm may determine that the object in the sensed image is the object-of-interest. A vehicle controller may then control the vehicle based on the identification of the object-of-interest.

SUMMARY

A method of updating an object identification algorithm of a vehicle is provided. The method includes sensing an image with an image sensor of the vehicle. An identification algorithm, operable on a computing device of the vehicle, then draws a plurality of boundary boxes in the image. The identification algorithm analyzes each respective one of the plurality of boundary boxes to attempt to identify an object-of-interest in each respective one of the boundary boxes, and/or a component of the object-of-interest in each respective one of the boundary boxes. If the identification algorithm successfully identifies an object-of-interest in the image in a respective one of the boundary boxes, then the identification algorithm defines the respective one of the plurality of boundary boxes containing the identified object-of-interest as an object boundary. If the identification algorithm successfully identifies a component of the object-of-interest in the image in a respective one of the boundary boxes, then the identification algorithm defines the respective one of the plurality of boundary boxes containing the identified component of the object-of-interest as a component boundary. The identification algorithm then calculates an excluded amount of the component boundary. The excluded amount is an amount of the component boundary that is not included in the object boundary. When the excluded amount is equal to or greater than a coverage threshold, the identification algorithm communicates the image to a processing center with a communicator of the vehicle.

In one aspect of the method of updating the identification algorithm, the excluded amount is compared to the coverage threshold to determine if the excluded amount is less than the coverage threshold, or if the excluded amount is equal to or greater than the coverage threshold. When the excluded amount is less than the coverage threshold, the identification algorithm does not communicate the image to the processing center.

In another aspect of the method of updating the identification algorithm, when the identification does communicate the image to the processing center, the identification algorithm further communicates other vehicle data related to the image. The other vehicle data may include, but is not limited to, other images immediately preceding and following the image, GPS data, vehicle operating data, radar data, LIDAR data, etc.

In another aspect of the method of updating the identification algorithm, a previously un-identified object-of-interest in the image that is associated with the identified component in the image may be identified at the processing center. When the previously un-identified object-of-interest is identified in the image, the image is added to a training set of images at the processing center to define a revised training set of images. The identification algorithm may then be re-trained to recognize the previously un-identified object-of-interest using the revised training set of images, to define an updated identification algorithm. The updated identification algorithm may then be uploaded onto the mobile computing device of the vehicle for future use.

In one embodiment of the method of updating the identification algorithm, a separation distance from the vehicle to the identified component in the image is estimated when the excluded amount is equal to or greater than the coverage threshold. The separation distance is compared to a distance threshold to determine if the separation distance is less than the distance threshold, or if the separation distance is equal to or greater than the distance threshold. A vehicle controller may then control vehicle using a pre-defined control mode when the separation distance is less than the distance threshold.

An object identification system is also provided. The object identification system includes a processing center and a vehicle. The processing center includes a central computing device. The vehicle includes an image sensor operable to capture and image, a communicator operable to send and receive data to and from the processing center, and a mobile computing device in communication with the central computing device of the processing center. The mobile computing device includes a processor and a memory. The memory of the mobile computing device includes an identification algorithm. The processor of the mobile computing device is operable to execute the identification algorithm to sense an image with the image sensor of the vehicle. A plurality of boundary boxes is then drawn in the image. Each of the plurality of boundary boxes is analyzed to attempt to identify an object-of-interest therein. If an object-of-interest is identified in a respective one of the plurality of boundary boxes, then the respective one of the plurality of boundary boxes containing the identified object-of-interest is defined as an object boundary. Each of the plurality of boundary boxes is further analyzed to attempt to identify a component of the object-of-interest therein. If a component of the object-of-interest is identified in a respective one of the plurality of boundary boxes, then the respective one of the plurality of boundary boxes containing the identified component of the object-of-interest is defined as a component boundary. An excluded amount of the component boundary is then calculated. The excluded amount is an amount of the component boundary that is not included in the object boundary. When the excluded amount is equal to or greater than a coverage threshold, the image is communicated to the processing center with the communicator of the vehicle. The central computing device includes a processor and a memory having a set of training images and a training algorithm stored therein. The processor of the central computing device is operable to execute the training algorithm to identify a previously un-identified object-of-interest in the image. If a previously un-identified object-of-interest is identified in the image, the image is saved in the training set of images to define a revised training set of images. The identification algorithm is then re-trained using the revised training set of images to define an updated identification algorithm, in order to identify the previously un-identified object-of-interest. The updated identification algorithm is uploaded from the central computing device at the processing center to the mobile computing device of the vehicle for future use by the mobile computing device.

In one aspect of the object identification system, the processor of the mobile computing device is operable to execute the identification algorithm to compare the excluded amount to the coverage threshold to determine if the excluded amount is less than the coverage threshold, or if the excluded amount is equal to or greater than the coverage threshold. When the excluded amount is less than the coverage threshold the identification algorithm does not communicate the image to the processing center.

A vehicle is also provided. The vehicle includes an image sensor operable to capture an image in an electronic format, a communicator operable to send and receive data, and a mobile computing device in communication with the image sensor and the communicator. The mobile computing device includes a processor and a memory having an identification algorithm stored therein. The processor is operable to execute the identification algorithm to sense an image with the image sensor of the vehicle, and draw a plurality of boundary boxes in the image. Each of the plurality of boundary boxes is analyzed to attempt to identify an object-of-interest therein. If an object-of-interest is identified in a respective one of the plurality of boundary boxes, then the respective one of the plurality of boundary boxes containing the identified object-of-interest is defined as an object boundary. Each of the plurality of boundary boxes is analyzed to attempt to identify a component of the object-of-interest therein. If a component of the object-of-interest is identified in a respective one of the plurality of boundary boxes, then the respective one of the plurality of boundary boxes containing the identified component of the object-of-interest is defined as an object boundary. An excluded amount of the component boundary is then calculated. The excluded amount is an amount of the component boundary that is not included in the object boundary. When the excluded amount is equal to or greater than a coverage threshold, the image is communicated to the processing center with the communicator of the vehicle. The processor is operable to execute the identification algorithm to further receive an updated identification algorithm from the processing center, which has been re-trained using the image communicated to the processing center.

Accordingly, the process described herein improves the effectiveness of the identification algorithm operating on the mobile computing device of the vehicle. By identifying components of an object-of-interest, and comparing the respective component boundary to the object boundary, the identification algorithm may determine if the excluded amount of the component boundary is greater than or less than the coverage threshold. If the excluded amount of the component boundary is low, i.e., the excluded amount is less than the coverage threshold, then a small portion of the component boundary is outside of the object boundary, and the identification algorithm may determine that the identified component is associated with the identified object-of-interest. In which case, no further action is required. In contrast, if the excluded amount of the component boundary is high, i.e., the excluded amount is greater than the coverage threshold, then a large portion of the component boundary is outside of the object boundary, and the identification algorithm may determine that the identified component is not associated with the identified object-of-interest. If the identified component is not associated with the identified object-of-interest, or if no object-of-interest was identified but a component of an object-of-interest was identified, then a previously un-identified object-of-interest may exist in the image that is not identifiable by the identification algorithm. In this circumstance, when the excluded amount of the component boundary is equal to or greater than the coverage threshold, the image is communicated to the processing center for further evaluation. The central computing device of the processing center, or personnel at the processing center, may analyze the image and identify a previously un-identified object-of-interest that is associated with the identified component in the image. If so, the image may be added to the set of training images to define the revised set of training images, and used to re-train the identification algorithm so that the next time the previously un-identified object-of-interest included in the image is encountered, the updated identification algorithm will be able to identify the object as an object-of-interest.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
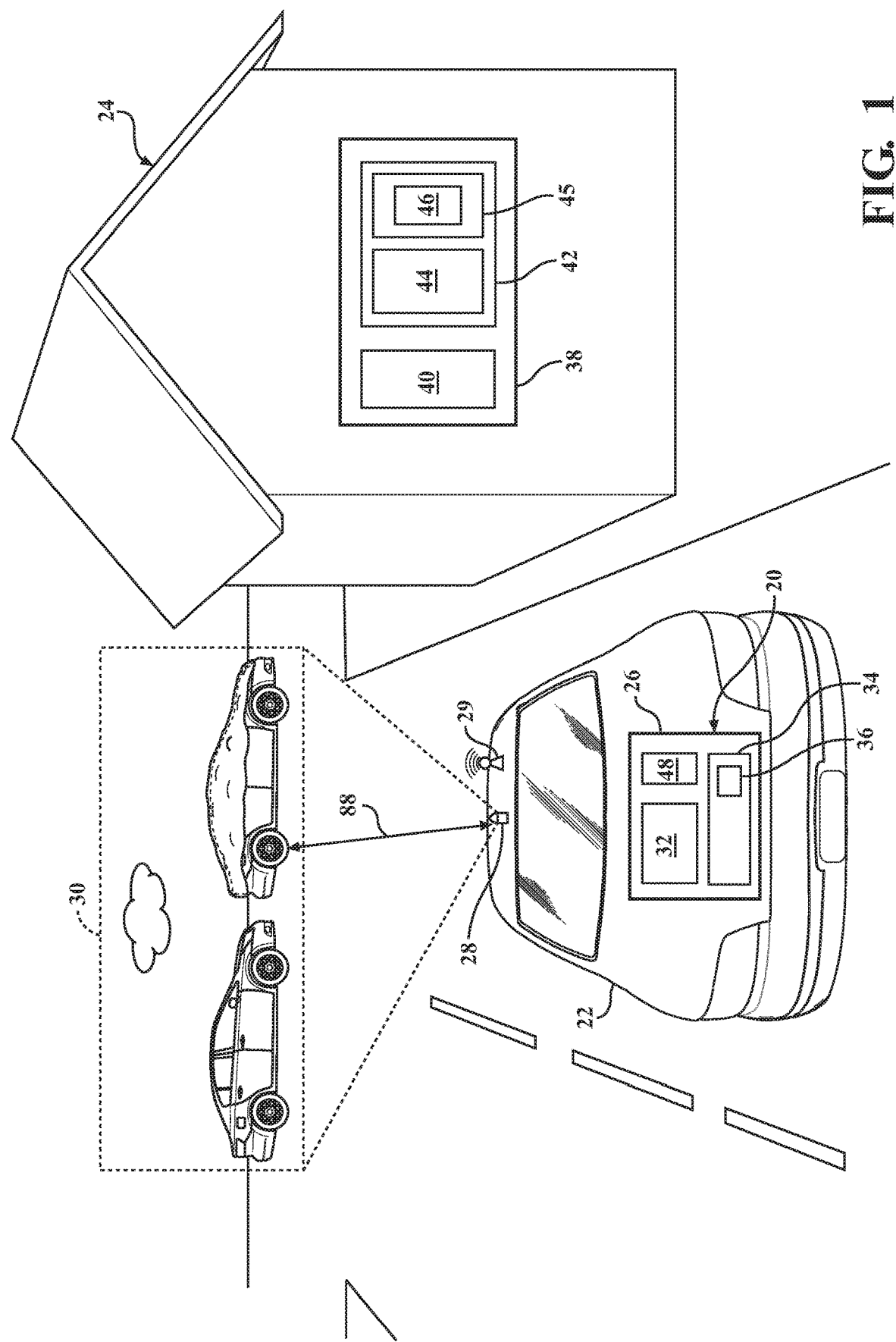
FIG. 1 is a schematic plan view of an object identification system.

Referring to the FIGS., wherein like numerals indicate like parts throughout the several views, an object identification system is generally shown at 20 in FIG. 1. The object identification system 20 is used to identify objects encountered by a vehicle 22. The vehicle 22 may include a moveable platform, such as but not limited to a car, a truck, a van, a boat, a train, an ATV, a UTV, etc. The object identification system 20 may operate as part of another vehicle system, such as but not limited to a driver assist system, a semi-autonomous operating system, or a fully autonomous operating system.

The object identification system 20 includes the vehicle 22, and a processing center 24. The vehicle 22 includes a computing device 26, an image sensor 28, and a communicator 29. The computing device 26 of the vehicle 22 may be referred to herein as the mobile computing device 26. The image sensor 28 may include, but is not limited to, a camera or other device capable of sensing, capturing, and saving an image 30 in a digital or electronic format. The image sensor 28 is in communication with the mobile computing device 26. The image sensor 28 communicates the sensed image 30 to the mobile computing device 26. The vehicle 22 may further include other sensors and/or systems that communicate data related to the operation of the vehicle 22 to the mobile computing device 26. For example, the vehicle 22 may include a LIDAR system, a radar system, a GPS system, speed sensors, accelerometers, etc.

The mobile computing device 26 may be referred to as a computer, a control module, a control unit, a vehicle controller, etc. The mobile computing device 26 includes a processor 32 and a memory 34, and may further include software, hardware, algorithms, connections, sensors, etc., for implementing the object identification system 20 on the vehicle 22. As such, a method, described below, may be embodied as a program or algorithm at least partially operable on the mobile computing device 26. It should be appreciated that the mobile computing device 26 may include a device capable of analyzing data from various sensors, comparing data, making decisions, and executing defined tasks.

The mobile computing device 26 may be embodied as one or multiple digital computers or host machines each having one or more processors 32, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics.

The computer-readable memory 34 may include non-transitory/tangible medium which participates in providing data or computer-readable instructions. The memory 34 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The mobile computing device 26 includes the tangible, non-transitory memory 34 on which are recorded computer-executable instructions, including an identification algorithm 36. The processor 32 of the mobile computing device 26 is configured for executing the identification algorithm 36. The identification algorithm 36 implements a method of identifying or classifying objects, and updating the identification algorithm 36 to improve future object recognition.

The processing center 24 is located remotely from the vehicle 22. The processing center 24 may include one or more fixed locations. Alternatively, the processing center 24 may include a Cloud based network. The processing center 24 includes at least one computing device 38. The computing device 38 of the processing center 24 may be referred to herein as the central computing device 38. The mobile computing device 26 of the vehicle 22 is at least periodically in communication with the central computing device 38 via the communicator 29 for communicating data therebetween. The communicator 29 may include a device or system capable of transmitting and receiving data to and from the vehicle 22 and the processing center 24. The specific type and operation of the communicator 29 is not pertinent to the teachings of this disclosure, are understood by those skilled in the art, and are therefore not described in detail herein.

The central computing device 38 includes a processor 40 and a memory 42, and may further include software, hardware, algorithms, connections, sensors, etc., for implementing at least portions of the object identification system 20. As such, a method, described below, may be embodied as a program or algorithm at least partially operable on the central computing device 38. It should be appreciated that the central computing device 38 may include a device capable of analyzing data from various sensors, comparing data, making decisions, and executing defined tasks.

The central computing device 38 may be embodied as one or multiple digital computers or host machines each having one or more processors 40, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics.

The computer-readable memory 42 may include non-transitory/tangible medium which participates in providing data or computer-readable instructions. The memory 42 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The central computing device 38 includes the tangible, non-transitory memory 42 on which are recorded computer-executable instructions, including a training algorithm 44. A training set 45 of images 46 may further be saved on the memory 42 of the central computing device 38. The processor 40 of the central computing device 38 is configured for executing the training algorithm 44. The training algorithm 44 at least partially implements the method of updating the identification algorithm 36 to improve future object recognition.

Figure 2:
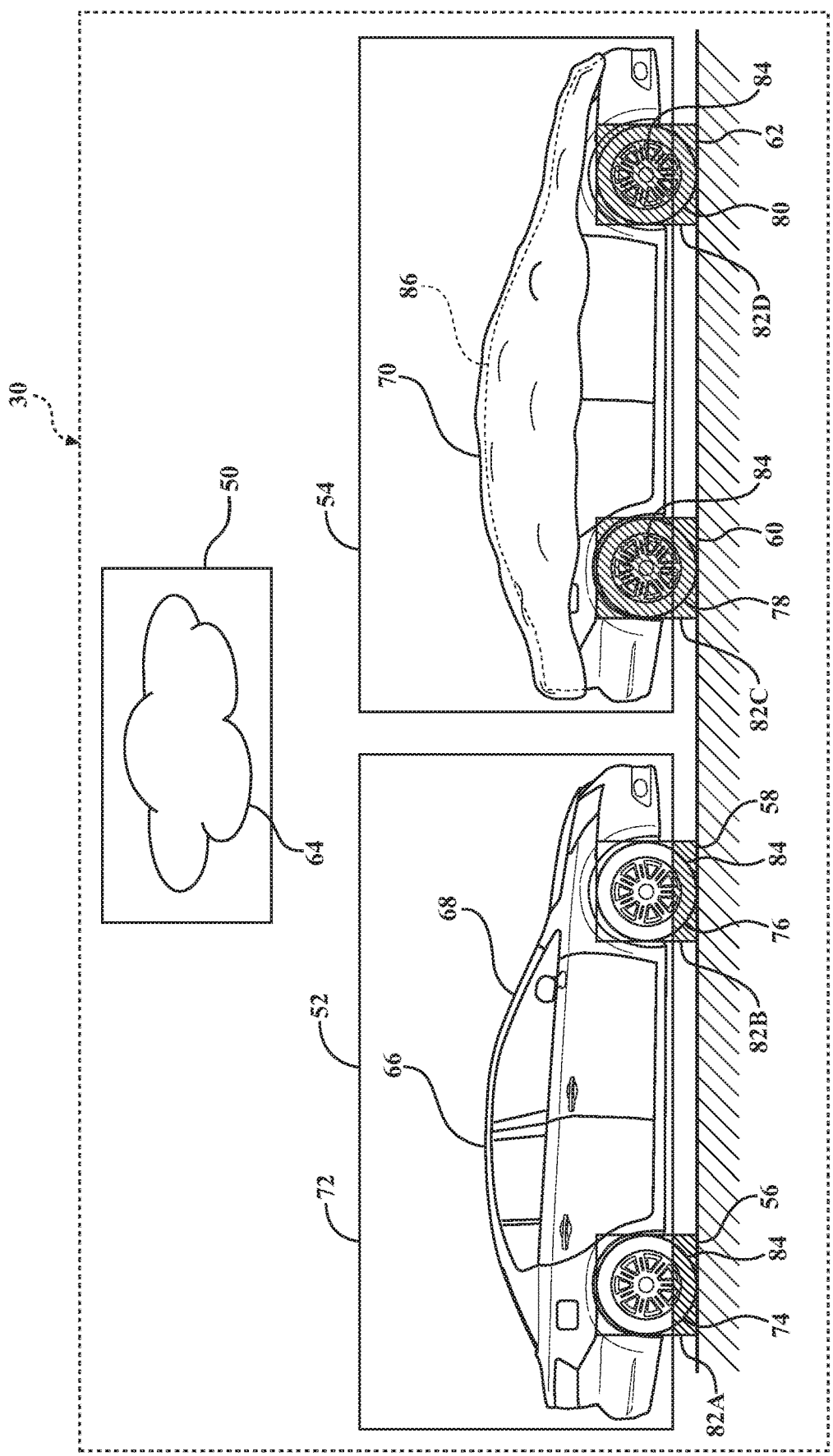
FIG. 2 is a schematic plan view of an image having an object-of-interest.
Figure 3:
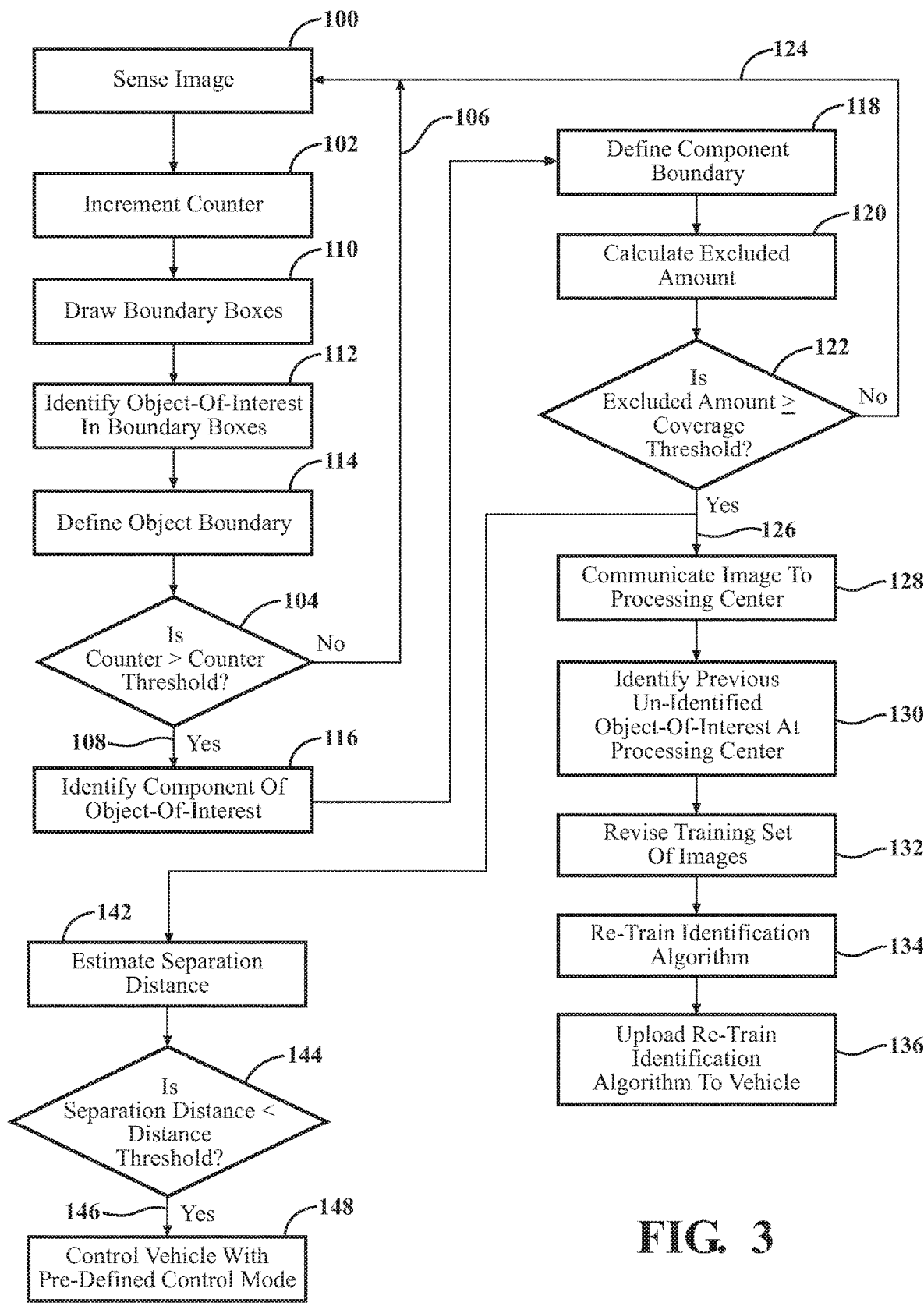
FIG. 3 is a flowchart illustrating a method of training an identification algorithm.

As noted above, the object identification system 20 implements a method of updating the identification algorithm 36 of the vehicle 22 used to identify or classify objects. Referring to FIG. 3, the method includes sensing the image 30 with the image sensor 28 of the vehicle 22. The step of sensing the image 30 is generally indicated by box 100 in FIG. 3. The exemplary image 30 is best shown in FIG. 2. The image 30 is taken of objects and features disposed near the vehicle 22. The image 30 may be taken from a perspective or direction of the vehicle 22, such as a forward direction, a side direction, a rearward direction, etc. The captured image 30 is communicated to the mobile computing device 26, and may be saved in the memory 34 of the mobile computing device 26.

In one or more embodiments, the mobile computing device 26 increments a counter 48 for each new image 30 sensed and communicated to the mobile computing device 26. The step of incrementing the counter 48 is generally indicated by box 102 in FIG. 3. The counter 48 may be incremented by a count of one for each image 30 sensed.

The identification algorithm 36 analyzes the image 30 to identify or classify an object-of-interest. The process used by the identification algorithm 36 to identify or classify an object-of-interest in the image 30 is understood by those skilled in the art, and is therefore not described in detail herein. However, briefly described as it relates to the process described herein, the identification algorithm 36 draws or overlays a plurality of boundary boxes 50, 52, 54, 56, 58, 60, 62 of varying sizes, shapes, and locations on the image 30. The boundary boxes 50, 52, 54, 56, 58, 60, 62 may be defined by various different two dimensional polygon shapes, such as but not limited to squares, rectangles, triangles, hexagons, etc. The step of drawing the boundary boxes 50, 52, 54, 56, 58, 60, 62 in the image 30 is generally indicated by box 110 in FIG. 3. The precise number, size and location of the boundary boxes 50, 52, 54, 56, 58, 60, 62 is not pertinent to the teachings of this disclosure. Referring to FIG. 2, the image 30 is shown with a first boundary box 50, a second boundary box 52, a third boundary box 54, a fourth boundary box 56, a fifth boundary box 58, a sixth boundary box 60, and a seventh boundary box 62. It should be understood that the identification algorithm 36 draws more than the first boundary box 50, the second boundary box 52, the third boundary box 54, the fourth boundary box 56, the fifth boundary box 58, the sixth boundary box 60 and the seventh boundary box 62 shown in FIG. 2. However, for clarity, these additional boundary boxes 50, 52, 54, 56, 58, 60, 62 are not shown.

Once the boundary boxes 50, 52, 54, 56, 58, 60, 62 have been drawn in the image 30, the identification algorithm 36 analyzes each respective one of the plurality of boundary boxes 50, 52, 54, 56, 58, 60, 62 to attempt to identify an object-of-interest therein. The step of identifying an object-of-interest in a respective one of the boundary boxes 50, 52, 54, 56, 58, 60, 62 is generally indicated by box 112 in FIG. 3. As understood by those skilled in the art, object recognition programs, such as the identification algorithm 36, are trained using the training set 45 of images 46 to recognize one or more objects-of-interest. The object-of-interest may include, but is not limited to, persons, animals, cars, trucks, vans, signs, etc. The set 45 of training images 46 show the object-of-interest in several different views, from several different perspectives, and in several different conditions. The identification algorithm 36 is trained to recognize objects within each respective one of the plurality of boundary boxes 50, 52, 54, 56, 58, 60, 62 based on their similarity to one or more of the image 30s included in the training set 45 of images 46. If the identification algorithm 36 recognizes an object within one of the boundary boxes 50, 52, 54, 56, 58, 60, 62 in the image 30, then the identification algorithm 36 may identify that object as an object-of-interest, and classify it accordingly. It should be appreciated that the identification algorithm 36 may be trained to recognize several different classes or types of objects-of-interest, with each class being defined as one of persons, animals, cars, trucks, vans, signs, etc.

For example, referring to FIG. 2, the first boundary box 50 is shown including a cloud 64. The cloud 64 may not represent a class of an object-of-interest. As such, the identification algorithm 36 is not trained to recognize the cloud 64, and the identification algorithm 36 does not identify the cloud 64 as a defined object-of-interest. As shown in FIG. 2, the second boundary box 52 is shown including a recognizable car 66. The recognizable car 66 may represent a class of an object-of-interest for which the identification algorithm 36 is trained to recognize, e.g., vehicle 22s. As such, the identification algorithm 36 may identify the object in the second boundary box 52 as an object-of-interest, i.e., an identified object-of-interest 68. As shown in FIG. 2, the third boundary box 54 is shown including a snow covered vehicle 70. The snow covered vehicle 70 may represent a class of an object-of-interest for which the identification algorithm 36 is trained to recognize, e.g., vehicle 22s, however, the identification algorithm 36 may not be able to recognize the snow covered vehicle 70 because its shape is altered by the snow, and therefore does not resemble the images 46 from which the identification algorithm 36 was originally trained from. As such, the identification algorithm 36 would not identify the snow covered vehicle 70 within the third boundary box 54 as a defined object-of-interest.

If the identification algorithm 36 is able to identify an object-of-interest in a respective one of the boundary boxes 50, 52, 54, 56, 58, 60, 62, then the identification algorithm 36 defines the respective one of the plurality of boundary boxes 50, 52, 54, 56, 58, 60, 62 containing the identified object-of-interest 68 as an object boundary 72. The step of defining the object boundary 72 is generally indicated by box 114 in FIG. 3. It should be appreciated that multiple object boundaries may be defined in the image 30, if the identification algorithm 36 is able to identify multiple objects in multiple boundary boxes 50, 52, 54, 56, 58, 60, 62. If the identification algorithm 36 is not able to identify an object-of-interest in one of the boundary boxes 50, 52, 54, 56, 58, 60, 62, then the identification algorithm 36 does not define an object boundary 72.

For example, referring to FIG. 2, because the identification algorithm 36 identified the car shown in the second boundary box 52 as the identified object-of-interest 68, the identification algorithm 36 would define the second boundary box 52 as an object boundary 72. However, since the identification algorithm 36 did not identify an object-of-interest in either the first boundary box 50 or the third boundary box 54, neither of the first boundary box 50 or the third boundary box 54 would be defined as object boundaries. While the example shown in FIG. 2 includes one of the plurality of boundary boxes 50, 52, 54, 56, 58, 60, 62 defined as an object boundary 72, it should be appreciated that other boundary boxes (not shown in FIG. 2) may be identified as object boundaries if the identification algorithm 36 identifies an object-of-interest therein.

In some embodiments, the process described below may be implemented for every image 30 captured by the image sensor 28. However, in the embodiment described herein, the process is implemented after the counter 48 reaches a counter threshold. The counter threshold may be defined to equal a number, such as for example, 10. As such, the process described below is implemented when the counter 48 increases to a value greater than the counter threshold, e.g., 10. Once the process has been executed for a sensed image 30, the counter 48 is reset to zero, and the process begins again, such that when the counter 48 again reaches a value greater than the counter threshold, the process described below repeats itself. By so doing, the computing resources are reduced, thereby improving the operation of the mobile computing device 26.

The counter 48 is compared to the counter threshold to determine if the value of the counter 48 is equal to or less than the counter threshold, or if the value of the counter 48 is greater than the counter threshold. The step of comparing the value of the counter 48 to the counter threshold is generally indicated by box 104 in FIG. 3. If the value of the counter 48 is equal to or less than the counter threshold, generally indicated at 106, then the identification algorithm 36 proceeds to sense another image 30. If the value of the counter 48 is greater than the counter threshold, generally indicated at 108, then the identification algorithm 36 proceeds to examine the image 30 as described below.

The identification algorithm 36 further analyzes each of the plurality of boundary boxes 50, 52, 54, 56, 58, 60, 62 to attempt to identify a component 74, 76, 78, 80 of the object-of-interest therein. The step of identifying the component 74, 76, 78, 80 is generally indicated by box 116 in FIG. 3. As briefly described above, the identification algorithm 36 may be trained to identify several different classes of object-of-interest. For example, the identification algorithm 36 may be trained to identify a first class defined as cars, and a second class defined as people. Each class of objects-of-interest may include one or more component classifications. For example, the first class of objects-of-interest, defined as cars, may include component classifications defined to include tires, wheels, license plates, headlights, etc. The second class of objects-of-interest, defined as people, may include component classifications defined to include bags hats, briefcases, strollers, etc. The identification algorithm 36 is trained to recognize each class of the objects-of-interest, and also each component classification of each class of the objects-of-interest.

Referring to FIG. 2, the plurality of boundaries includes the fourth boundary box 56, the fifth boundary box 58, the sixth boundary box 60, and the seventh boundary box 62. If the class of the object-of-interest is defined to include a car, and the component classification of the object-of-interest is defined to include a wheel, then the identification algorithm 36 may identify a first identified component 74 in the fourth boundary box 56, a second identified component 76 in the fifth boundary box 58, a third identified component 78 in the sixth boundary box 60, and a fourth identified component 80 in the seventh boundary box 62.

If the identification algorithm 36 is able to identify a component 74, 76, 78, 80 of the object-of-interest in a respective one of the boundary boxes 50, 52, 54, 56, 58, 60, 62, then the identification algorithm 36 defines the respective one of the plurality of boundary boxes 50, 52, 54, 56, 58, 60, 62 containing the identified component 74, 76, 78, 80 of the object-of-interest as a component boundary. The step of defining the component boundary is generally indicated by box 118 in FIG. 3. It should be appreciated that multiple component boundaries may be defined in the image 30, if the identification algorithm 36 is able to identify multiple components in multiple boundary boxes 50, 52, 54, 56, 58, 60, 62. If the identification algorithm 36 is not able to identify a component of the object-of-interest in one of the boundary boxes 50, 52, 54, 56, 58, 60, 62, then the identification algorithm 36 does not define a component boundary.

Referring to the example shown in FIG. 2, because the fourth boundary box 56 includes the first identified component 74, such as the exemplary tire/wheel shown in FIG. 2, the fourth boundary box 56 may be defined as a first component boundary 82A. Similarly, because the fifth boundary box 58 includes the second identified component 76, the fifth boundary box 58 may be defined as a second component boundary 82B. Likewise, because the sixth boundary box 60 includes the third identified component 78, the sixth boundary box 60 may be defined as a third component boundary 82C, and because the seventh boundary box 62 includes the fourth identified component 80, the seventh boundary box 62 may be defined as a fourth component boundary 82D.

The identification algorithm 36 may then calculate an excluded amount 84 of the component boundaries 82A, 82B, 82C, 82D. The step of calculating the excluded amount 84 is generally indicated by box 120 in FIG. 3. The excluded amount 84 is the amount of each respective one of the component boundaries 82A, 82B, 82C, 82D that is not included within the object boundary 72. In other words, the excluded amount 84 is the amount of each respective one of the component boundaries 82A, 82B, 82C, 82D that is outside of the object boundary 72. If an object boundary 72 was not defined, i.e., the identification algorithm 36 did not identify an object-of-interest, but the identification algorithm 36 did define a component boundary, i.e., the identification algorithm 36 did identify a component of the object-of-interest, then no portion of the component boundary is inside an object boundary 72, and the entire component boundary may be considered the excluded amount 84. If the identifications algorithm did define one or more object boundaries, yet no portion of the component boundary is inside of the object boundaries, then the entire component boundary may be considered the excluded amount 84. However, if the identification algorithm 36 did define one or more object boundaries, and the entire component boundary is located within one of the object boundaries, then the excluded amount 84 is equal to zero, because no portion of the component boundary is located outside of the object boundary 72.

Referring to the example of FIG. 2, the second boundary box 52 is the boundary box defined as an object boundary 72. Therefore, the excluded amount 84 for each of the component boundaries 82A, 82B, 82C, 82D is calculated relative to the second boundary box 52. Since the first boundary box 50 and the third boundary box 54 were not defined as object boundaries, the excluded amount 84 of the component boundaries 82A, 82B, 82C, 82D are not calculated relative to the first boundary box 50 or the third boundary box 54. As shown in FIG. 2, the excluded amount 84 for each of the first component boundary 82A, the second component boundary 82B, the third component boundary 82C, and the fourth component boundary 82D is generally indicated by their respective cross hatched area of each. As described above, the excluded amount 84 is the amount of each respective component boundary 82A, 82B, 82C, 82D not disposed inside of an object boundary 72. Since a portion of each of the first component boundary 82A and the second component boundary 82B is disposed within the object boundary 72 defined by the first boundary box 50, the portions of the first component boundary 82A and the second component boundary 82B disposed outside of the first object boundary 72 is defined as the excluded amount 84 of the first component boundary 82A and the second component boundary 82B respectively. Since the entirety of each of the third component boundary 82C and the fourth component boundary 82D is disposed outside of the object boundary 72 defined by the first boundary box 50, the entirety of each of the third component boundary 82C and the fourth component boundary 82D is defined as the excluded amount 84 of the third component boundary 82C and the fourth component boundary 82D respectively.

The excluded amount 84 may include an amount based on a ratio of an area of the component boundary 82A, 82B, 82C, 82D outside of the object boundary 72 relative to an area of the component boundary 82A, 82B, 82C, 82D inside the object boundary 72. In other embodiments, the excluded amount 84 may include a number of pixels of the image 30 contained in the portion of the component boundary 82A, 82B, 82C, 82D that is located outside of the object boundary 72 relative to a number of pixels of the image 30 contained in the portion of the component boundary 82A, 82B, 82C, 82D that is located inside the object boundary 72. It should be appreciated that other criteria for calculating the excluded amount 84 of the component boundaries 82A, 82B, 82C, 82D may be used.

Once the identification algorithm 36 has calculated the excluded amount 84, then the identification algorithm 36 compares the excluded amount 84 to a coverage threshold to determine if the excluded amount 84 is less than the coverage threshold, or if the excluded amount 84 is equal to or greater than the coverage threshold. The step of comparing the excluded amount 84 to the coverage threshold is generally indicated by box 122 in FIG. 3. The coverage threshold is a defined limit of the excluded amount 84 used to trigger further examination of the image 30. It should be appreciated that each respective component boundary 82A, 82B, 82C, 82D may be compared to multiple object boundaries, if multiple object boundaries are defined in the image 30. As such, each respective component boundary 82A, 82B, 82C, 82D may have a different excluded amount 84 for each object boundary 72 to which it is compared.

Referring to the example shown in FIG. 2, the excluded amount 84 for each of the first component boundary 82A, the second component boundary 82B, the third component boundary 82C, and the fourth component boundary 82D are compared to the coverage threshold respectively. As described above, the coverage threshold may be defined as a percentage, for example, 80%. As shown in FIG. 2, the excluded amount 84 for each of the first component boundary 82A and the second component boundary 82B is approximately equal to 25%. Accordingly, the excluded amount 84 for each of the first component boundary 82A and the second component boundary 82B is less than the coverage threshold. This indicates that a large portion of the first identified component 74 and the second identified component 76 of the fourth boundary box 56 and the fifth boundary box 58 is incorporated into or part of the identified object-of-interest 68 of the second boundary box 52, and that the first identified component 74 and the second identified component 76 of the fourth boundary box 56 and the fifth boundary box 58 respectively are most likely associated with the identified object-of-interest 68 of the second boundary box 52. However, the excluded amount 84 for each of the third component boundary 82C and the fourth component boundary 82D is equal to 100%, because they are entirely outside of the object boundary 72. Accordingly, the excluded amount 84 for each of the third component boundary 82C and the fourth component boundary 82D is equal to or greater than the coverage threshold. This indicates that the third identified component 78 and the fourth identified component 80 are most likely not associated with the identified object-of-interest 68 of the second boundary box 52. This may indicate that the identification algorithm 36 was unable to identify an object-of-interest in the image 30 that is associated with the third identified component 78 and the fourth identified component 80 of the sixth boundary box 60 and the seventh boundary box 62 respectively, i.e., the snow covered vehicle 70 in the third boundary box 54.

When the identification algorithm 36 determines that the excluded amount 84 is less than the coverage threshold, generally indicated at 124 in FIG. 3, the identification algorithm 36 does not communicate the sensed image 30 to the processing center 24. The identification algorithm 36 proceeds to sense the next image 30, generally indicated by box 100 in FIG. 3.

When the identification algorithm 36 determines that the excluded amount 84 is equal to or greater than the coverage threshold, generally indicated at 126 in FIG. 3, then the identification algorithm 36 does communicate the image 30 to the processing center 24. The step of communicating the image 30 to the processing center 24 is generally indicated by box 128 in FIG. 3. In addition to the image 30, the identification algorithm 36 may also communicate other vehicle data related to the image 30 to the processing center 24. The other vehicle data may include, but is not limited to, images immediately preceding and/or following the image 30, the location of the vehicle 22, current speed, radar data, LIDAR data, etc. The image 30 and the other vehicle data may be communicated to the processing center 24 via the communicator 29.

Once the identification algorithm 36 operating on the mobile computing device 26 of the vehicle 22 has communicated the image 30 to the processing center 24, the image 30 is analyzed at the processing center 24 to identify a previously un-identified object-of-interest 86 in the image 30 (shown in FIG. 2). The step of identifying the previously un-identified object-of-interest 86 at the processing center 24 is generally indicated by box 130 in FIG. 3. The previously un-identified object-of-interest 86 in the image 30 may be identified and/or described in a suitable manner. For example, a human operator may examine the image 30, and manually identify the previously un-identified object-of-interest 86. Alternatively, the central computing device 38 of the processing center 24 may identify the previously un-identified object-of-interest 86 using the training algorithm 44. For example, the training algorithm 44 may include a more robust and better trained object recognition software than that of the identification algorithm 36, and may devote more resources and processing time to the task of identifying the previously un-identified object-of-interest 86 in the image 30.

If a previously un-identified object-of-interest 86 is identified in the image 30, then the training algorithm 44 may add the image 30 to the training set 45 of images 46 at the processing center 24, to define a revised training set 45 of images 46. The step of adding the image 30 to the training set 45 of images 46 is generally indicated by box 132 in FIG. 3. The training algorithm 44 may then re-train the identification algorithm 36 using the revised training set 45 of images 46 to define an updated identification algorithm 36. The step of re-training the identification algorithm 36 is generally indicated by box 134 in FIG. 3. The process used to train and/or re-train the identification algorithm 36 using the training set 45 of images 46 and/or the revised training set 45 of images 46 respectively is understood by those skilled in the art, and is therefore not described in detail herein.

Once the training identification algorithm 36 has been re-trained to define the updated identification algorithm 36, the updated identification algorithm 36 may then be uploaded from the processing center 24 to the mobile computing device 26 of the vehicle 22 via the communicator 29 of the vehicle 22. The step of uploading the updated identification algorithm 36 is generally indicated by box 136 in FIG. 3. Once the updated identification algorithm 36 is uploaded onto the mobile computing device 26 of the vehicle 22, it may be used in the future for object identification. Since the updated identification algorithm 36 has been re-trained using the revised training set 45 of images 46, including the previously un-identified object-of-interest 86 in the image 30, the updated identification algorithm 36 may be capable of identifying or classifying objects in the future that are similar to the previously un-identified object-of-interest 86.

In another aspect of the disclosure, when the excluded amount 84 is equal to or greater than the coverage threshold, generally indicated at 126 in FIG. 3, then the vehicle 22 may be unable to determine the best manner in which to control the vehicle 22. As such, when the excluded amount 84 is equal to or greater than the coverage threshold, the identification algorithm 36 may then estimate a separation distance 88 from the vehicle 22 to identified component in the image 30. The step of estimating the separation distance 88 is generally indicated by box 142 in FIG. 3. The separation distance 88 may be calculated or sensed in a suitable manner, such as using radar, LIDAR, etc.

Referring to the example shown in FIG. 2, because the excluded amount 84 for first component boundary 82A of the first identified component 74 and the second component boundary 82B of the second identified component 76 was less than the coverage threshold, the identification algorithm 36 may determine that the first identified component 74 and the second identified component 76 of the fourth boundary box 56 and the fifth boundary box 58 respectively are associated with the identified object-of-interest 68 of the second boundary box 52. As such, the identification algorithm 36 may pass that identified object-of-interest 68 of the second boundary box 52 to a vehicle controller, for the vehicle controller to determine how best to control the vehicle 22.

However, because the possibility exists that the identification algorithm 36 was unable to identify an object-of-interest, e.g., the snow covered vehicle 70 in the third boundary box 54, because of the high probability that the third identified component 78 and the fourth identified component 80 of the sixth boundary box 60 and the seventh boundary box 62 respectively are not associated with the identified object-of-interest 68 of the second boundary box 52, the vehicle 22 controller may be unable to properly determine how to control the vehicle 22 around the third identified component 78 and the fourth identified component 80 of the sixth boundary box 60 and the seventh boundary box 62 respectively. For this reason, the identification algorithm 36 may calculate the separation distance 88 from the vehicle 22 to each of the third identified component 78 and the fourth identified component 80 respectively, and use the separation distance 88 as a determining factor in controlling the vehicle 22.

The mobile computing device 26 may then compare the separation distance 88 to a distance threshold to determine if the separation distance 88 is less than the distance threshold, or if the separation distance 88 is equal to or greater than the distance threshold. The step of comparing the separation distance 88 to the distance threshold is generally indicated by box 144 in FIG. 3. The distance threshold may represent a distance below which extra caution may be required. When the separation distance 88 is less than the distance threshold, generally indicated at 146 in FIG. 3, then the mobile computing device 26 may use a pre-defined control mode to control the vehicle 22. The step of controlling the vehicle 22 with the pre-defined control mode is generally indicated by box 148 in FIG. 3. The pre-defined control mode may include, but is not limited to, a lowered vehicle 22 operating speed, maneuvering the vehicle 22 away from the identified component, transferring control of the vehicle 22 to a human driver, etc.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of updating an object identification algorithm of a vehicle, the method comprising:

sensing an image with an image sensor of the vehicle;

drawing a plurality of boundary boxes in the image with an identification algorithm operable on a computing device of the vehicle;

analyzing each of the plurality of boundary boxes with the identification algorithm to attempt to identify an object-of-interest therein;

defining a respective one of the plurality of boundary boxes containing an identified object-of-interest as an object boundary, with the identification algorithm;

analyzing each of the plurality of boundary boxes with the identification algorithm to attempt to identify a component of the object-of-interest therein;

defining a respective one of the plurality of boundary boxes containing an identified component of the object-of-interest as a component boundary, with the identification algorithm;

calculating an excluded amount of the component boundary with the identification algorithm, wherein the excluded amount is an amount of the component boundary that is not included in the object boundary; and communicating the image to a processing center, with a communicator of the vehicle, when the excluded amount is equal to or greater than a coverage threshold.

2. The method set forth in claim 1, further comprising comparing the excluded amount to the coverage threshold to determine if the excluded amount is less than the coverage threshold, or if the excluded amount is equal to or greater than the coverage threshold.

3. The method set forth in claim 1, wherein communicating the image to the processing center includes communicating other vehicle data related to the image.

4. The method set forth in claim 1, further comprising identifying a previously un-identified object-of-interest in the image that is associated with the identified component in the image, at the processing center.

5. The method set forth in claim 1, further comprising estimating a separation distance from the vehicle to the identified component in the image when the excluded amount is equal to or greater than the coverage threshold.

6. The method set forth in claim 2, further comprising not communicating the image to the processing center when the excluded amount is less than the coverage threshold.

7. The method set forth in claim 4, further comprising adding the image to a training set of images at the processing center, to define a revised training set of images, when the previously un-identified object-of-interest is identified in the image.

8. The method set forth in claim 5, further comprising comparing the separation distance to a distance threshold to determine if the separation distance is less than the distance threshold, or if the separation distance is equal to or greater than the distance threshold.

9. The method set forth in claim 7, further comprising re-training the identification algorithm using the revised training set of images to define a updated identification algorithm.

10. The method set forth in claim 8, further comprising controlling the vehicle using a pre-defined control mode when the separation distance is less than the distance threshold.

11. The method set forth in claim 9, further comprising uploading the updated identification algorithm to the mobile computing device of the vehicle.

12. An object identification system comprising:

a processing center including a central computing device;

a vehicle including an image sensor operable to capture and image, a communicator operable to send and receive data to and from the processing center, and a mobile computing device in communication with the central computing device of the processing center;

wherein the mobile computing device includes a processor and a memory, wherein the memory of the mobile computing device includes an identification algorithm, and wherein the processor of the mobile computing device is operable to execute the identification algorithm to:

sense an image with the image sensor of the vehicle;

draw a plurality of boundary boxes in the image;

analyze each of the plurality of boundary boxes to attempt to identify an object-of-interest therein;

define a respective one of the plurality of boundary boxes containing an identified object-of-interest as an object boundary;

analyze each of the plurality of boundary boxes to attempt to identify a component of the object-of-interest therein;

define a respective one of the plurality of boundary boxes containing an identified component of the object-of-interest as a component boundary;

calculate an excluded amount of the component boundary, wherein the excluded amount is an amount of the component boundary that is not included in the object boundary; and communicate the image to the processing center, with the communicator of the vehicle, when the excluded amount is equal to or greater than a coverage threshold;

wherein the central computing device includes a processor and a memory having a set of training images and a training algorithm stored therein, wherein the processor of the central computing device is operable to execute the training algorithm to:

identify a previously un-identified object-of-interest in the image;

save the image in the training set of images to define a revised training set of images;

retrain the identification algorithm using the revised training set of images to define an updated identification algorithm; and up-load the updated identification algorithm from the central computing device at the processing center to the mobile computing device of the vehicle for future use by the mobile computing device.

13. The object identification system set forth in claim 12, wherein the processor of the mobile computing device is operable to execute the identification algorithm to compare the excluded amount to the coverage threshold to determine if the excluded amount is less than the coverage threshold, or if the excluded amount is equal to or greater than the coverage threshold.

14. The object identification system set forth in claim 13, wherein the processor of the mobile computing device is operable to execute the identification algorithm to not communicate the image the processing center when the excluded amount is less than the coverage threshold.

15. A vehicle comprising:

an image sensor operable to capture an image in an electronic format;

a communicator operable to send and receive data;

a mobile computing device in communication with the image sensor and the communicator, the mobile computing device including a processor and a memory having an identification algorithm stored therein, wherein the processor is operable to execute the identification algorithm to:

sense an image with the image sensor of the vehicle;

draw a plurality of boundary boxes in the image;

analyze each of the plurality of boundary boxes to attempt to identify an object-of-interest therein;

define a respective one of the plurality of boundary boxes containing an identified object-of-interest as an object boundary;

analyze each of the plurality of boundary boxes to attempt to identify a component of the object-of-interest therein;

define a respective one of the plurality of boundary boxes containing an identified component of the object-of-interest as a component boundary;

calculate an excluded amount of the component boundary, wherein the excluded amount is an amount of the component boundary that is not included in the object boundary; and communicate the image to the processing center, with the communicator of the vehicle, when the excluded amount is equal to or greater than a coverage threshold; and receive an updated identification algorithm from the processing center, wherein the updated identification algorithm is retrained using the image communicated to the processing center.

* * * * *